Aug. 12, 1941.   E. W. BRIDGE   2,252,248
CANDY SHAPING MACHINE
Filed Oct. 23, 1939   5 Sheets-Sheet 5
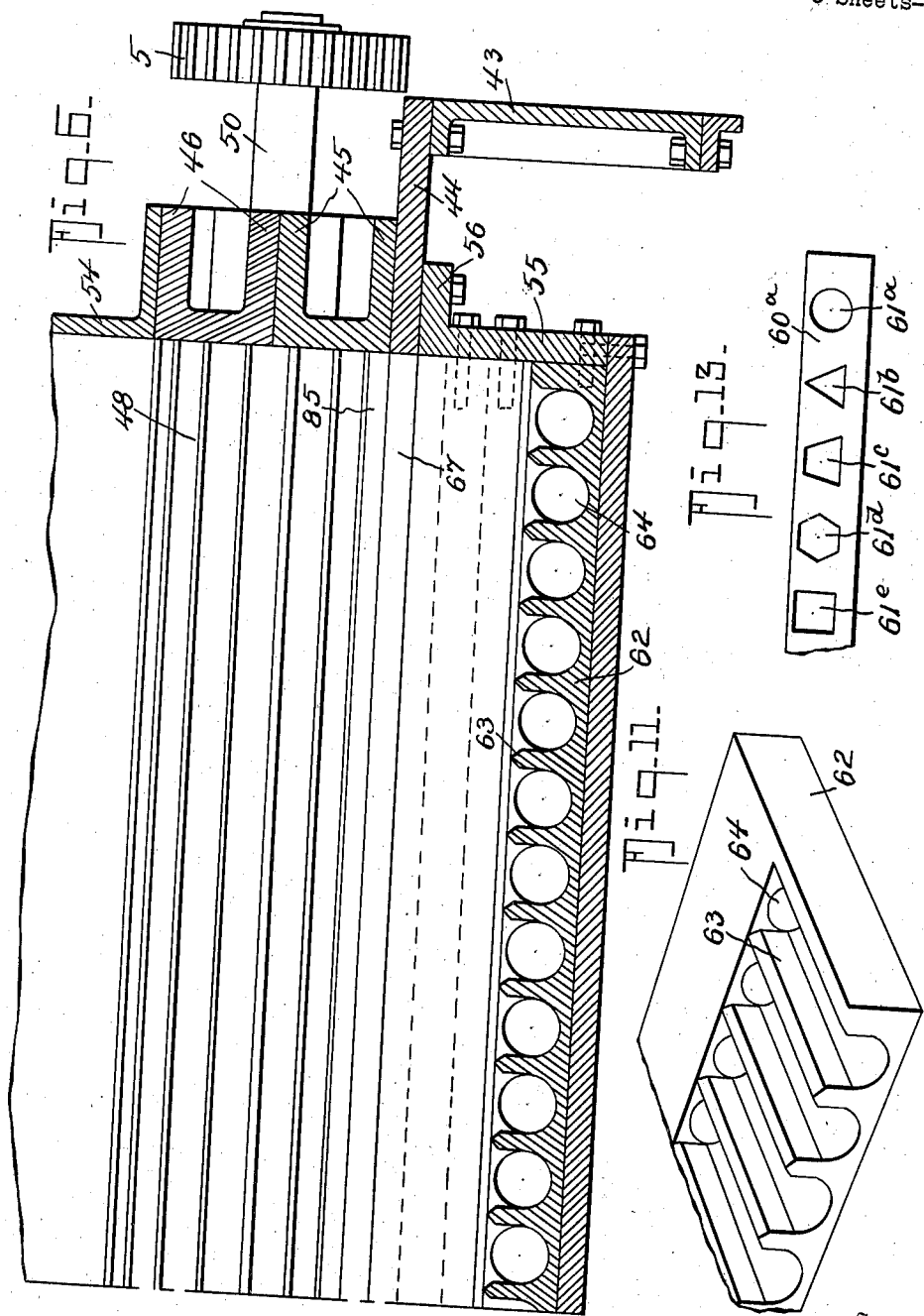
Inventor
Edward W. Bridge
By Dieterich & Rutley
Attorneys.

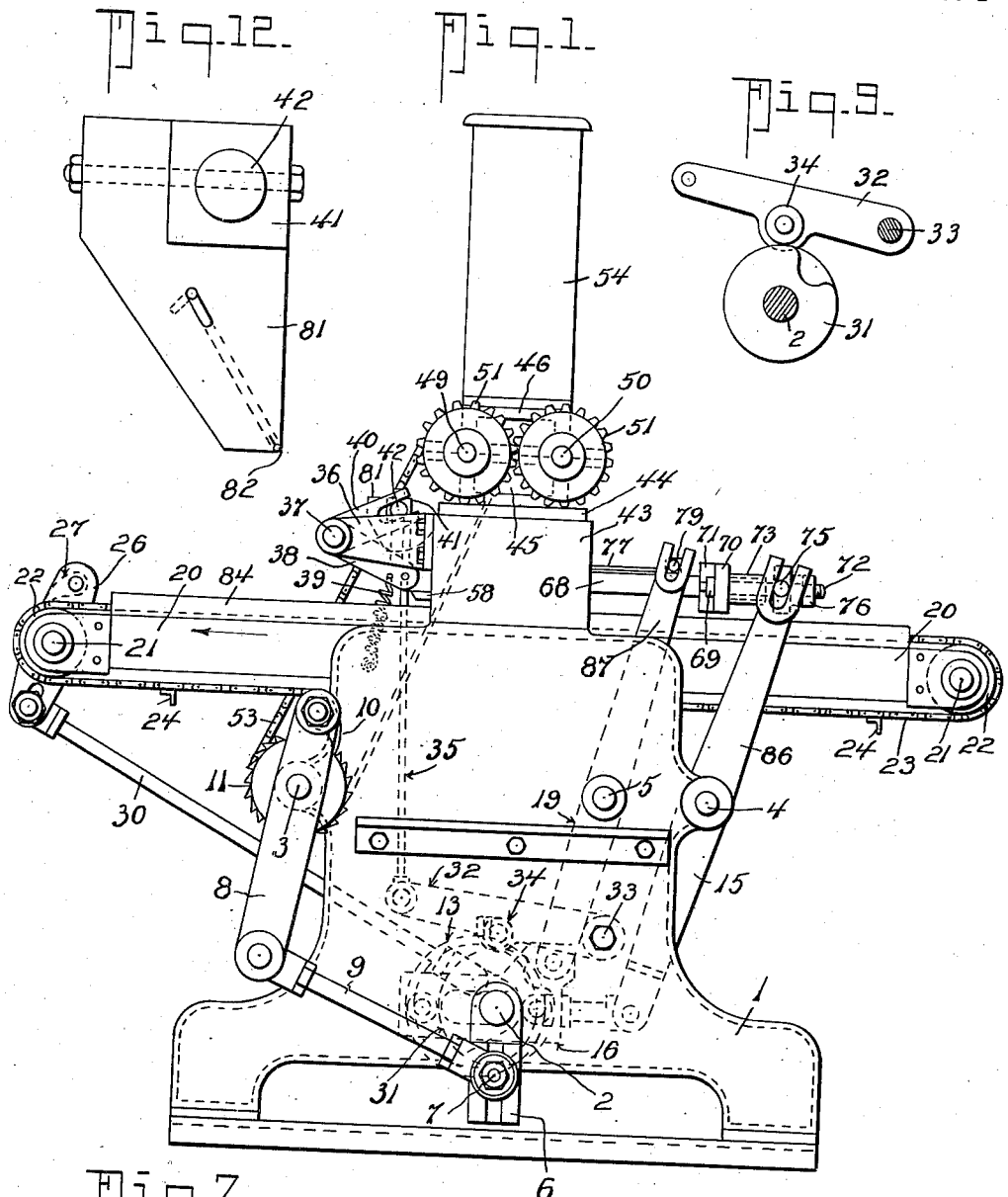

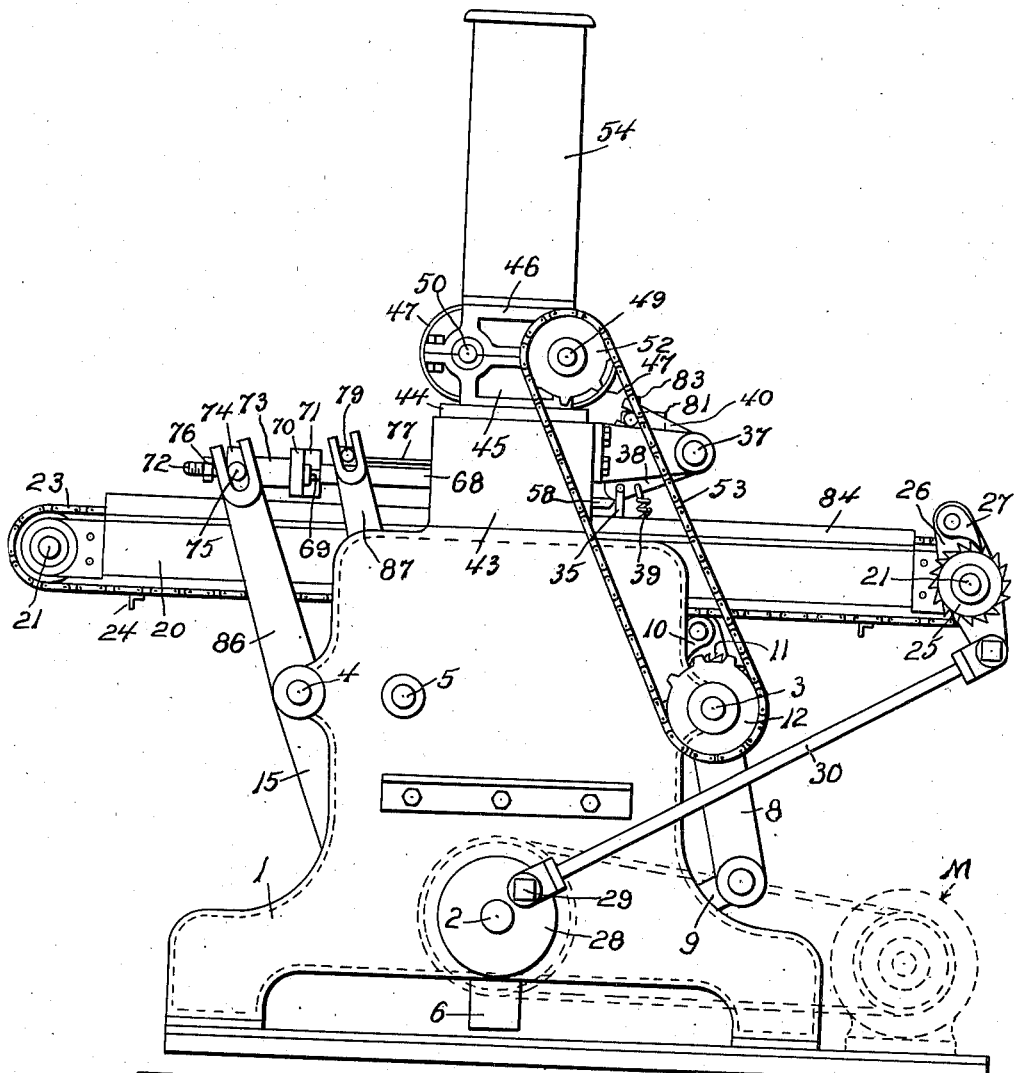
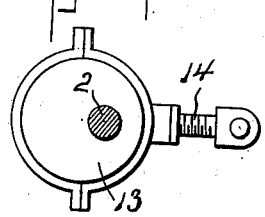

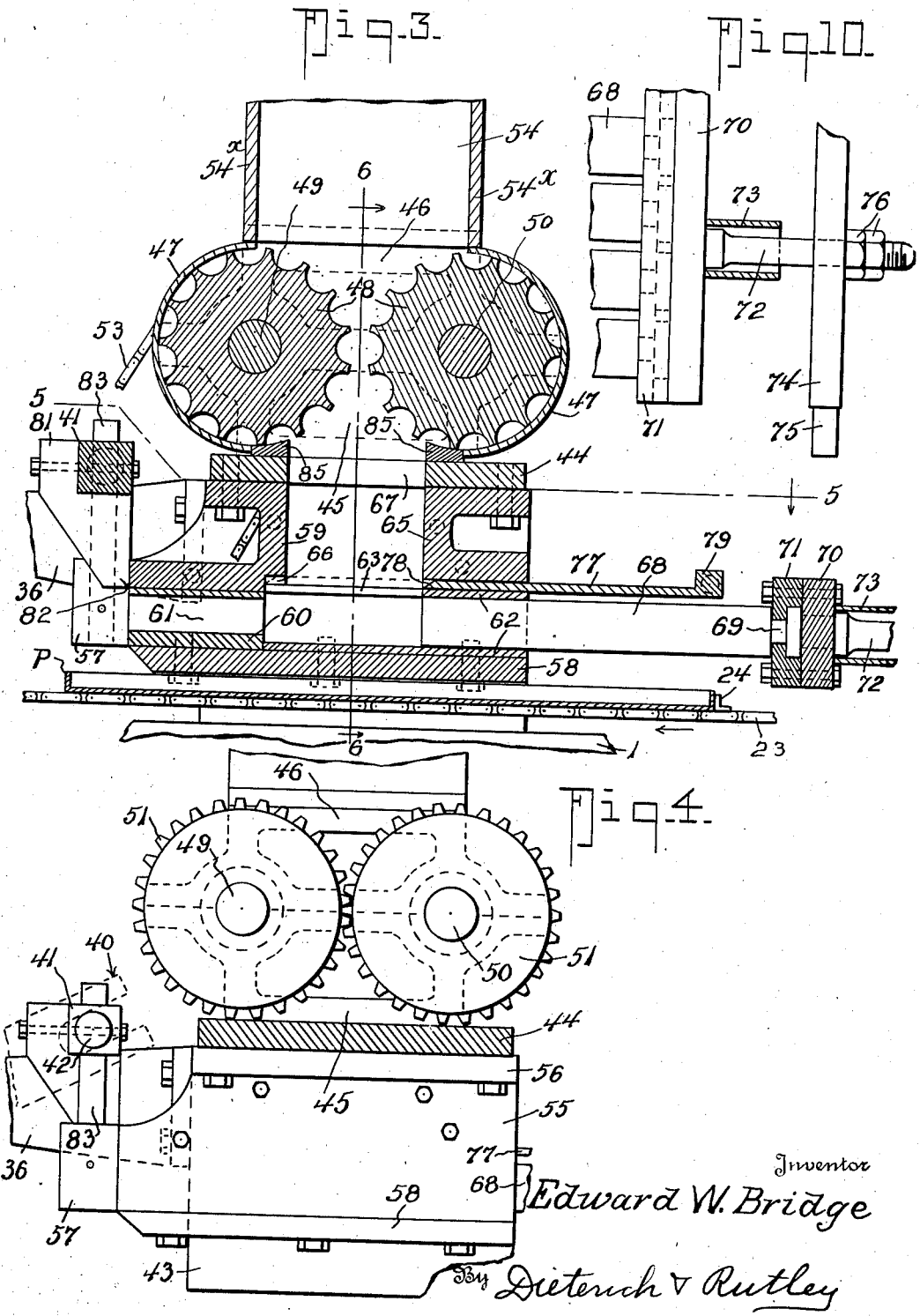

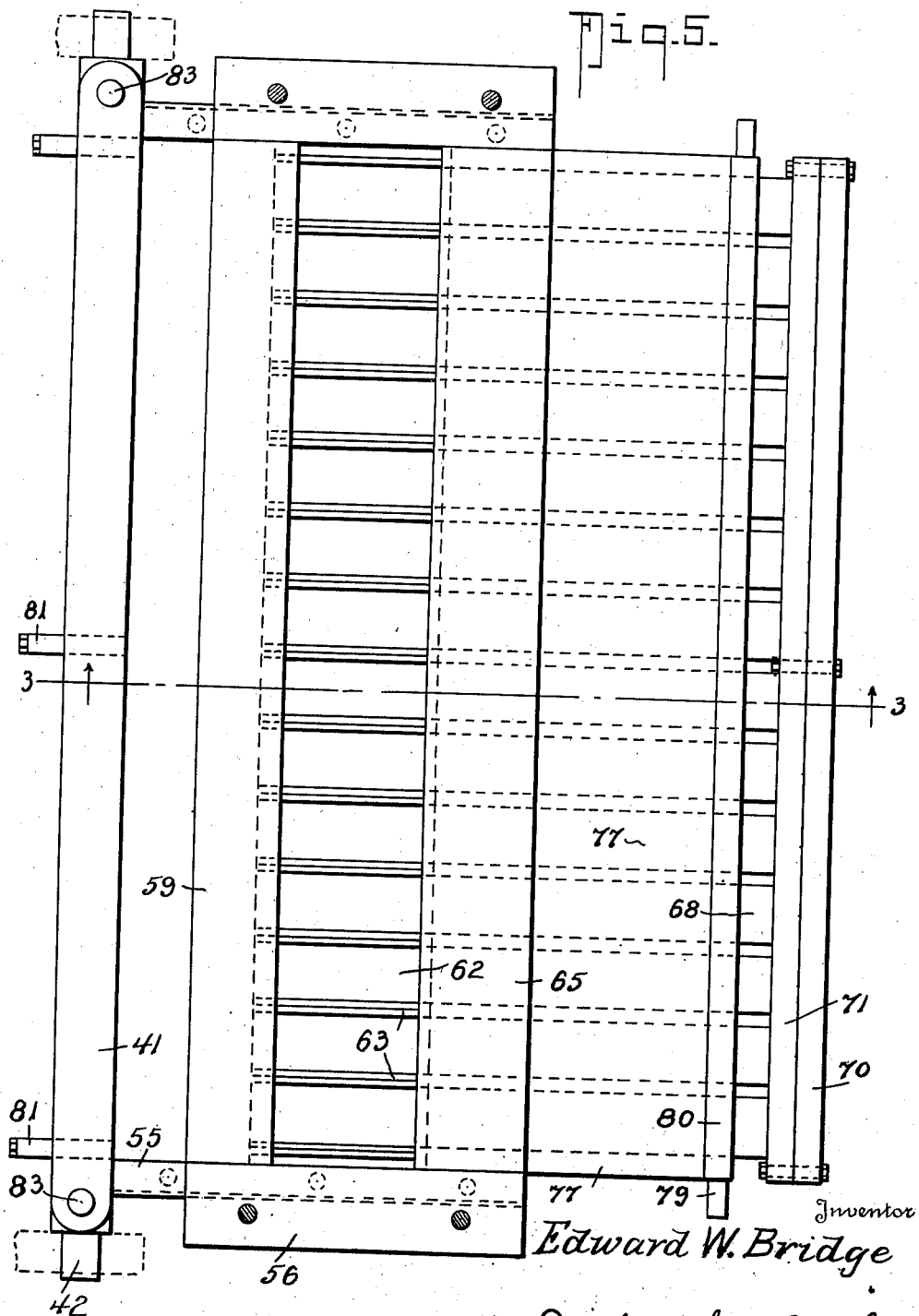

Patented Aug. 12, 1941

2,252,248

UNITED STATES PATENT OFFICE 2,252,248

CANDY SHAPING MACHINE

Edward W. Bridge, Philadelphia, Pa.

Application October 23, 1939, Serial No. 300,864

18 Claims. (Cl. 107—27)

My invention relates to machines for die expressing candy bars of various cross-sectional shapes and cutting the same into desired lengths.

The invention has for its objects to provide such a machine which will be relatively inexpensive to construct, a machine whose parts can be easily cleaned, a machine in which the parts that are subject to wear can be easily and quickly replaced, a machine whose die-bar may form but one shape or several shapes at a time.

Further, it is an object of the invention to provide a machine whose batch-feed may be regulated by adjusting the throw of a ratchet and can be made to harmonize with the conveyor feed.

Other objects of the invention will in part be obvious and in part will be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a side elevation of the machine.

Fig. 2 is a side elevation of the same, taken from the side opposite to Fig. 1.

Fig. 3 is an enlarged vertical section of a portion of the machine.

Fig. 4 is a detail side elevation of some of the structure shown in Fig. 3.

Fig. 5 is a horizontal section on about the line 5—5 of Fig. 3.

Fig. 6 is a detail vertical cross section on the line 6—6 of Fig. 3.

Fig. 7 is a detail elevation section showing the action of the valve cam.

Fig. 8 is a detail of the plunger operating eccentric.

Fig. 9 is a detail view of the cutter actuating cam.

Fig. 10 is a detail of the plunger stroke-adjusting means.

Fig. 11 is a detail perspective view of a part of the valve chest and plunger guide.

Fig. 12 is a detail view of the wire cutter.

Fig. 13 is a detail face view of a die or valve chest outlet plate.

In the drawings, in which like numerals and letters of reference indicate like parts in all the figures, 1 is a suitable frame, in bearings in which are mounted, respectively, a first motion shaft 2 (driven in any suitable way, say by an electric motor M, indicated in Fig. 2), a feed-roll operating shaft 3, and two rock shafts 4 and 5 respectively. At one side of the machine the shaft 2 carries a slotted crank arm 6 on which is adjustably mounted a crank pin 7.

A lever 8 is rockably mounted on shaft 3 and is connected to the crank pin 7 by a connecting rod 9 and carries a pawl 10 to engage a ratchet wheel on shaft 3. In this way, rotation of shaft 2 imparts rocking motion to lever 8 and pawl 10 advances ratchet 11 accordingly. The stroke may be regulated by adjusting the pin 7 in the slot of arm 6.

The shaft 3 also carries a sprocket 12 over which and over a sprocket 52 of feed-roll shaft 49 passes a chain 53.

The first motion shaft 2 has an eccentric 13 around which is the strap of a pitman 14, which is attached to the lower end of an arm 15 secured to shaft 4, which operates the plungers, as will later more fully be seen.

A slotted slide 16 on shaft 2 has rollers 17 to engage the valve operating cam 18 and is attached pivotally to the lower end of a lever 19 secured to shaft 5 and again later referred to.

The frame has extensions 20 suitably secured to it and these extensions 20 carry, at their outer ends, conveyor shafts 21 having (in the form shown) sprockets 22 over which chains 23 pass. The chains have pushers 24 for the pans P, into which the shapes are deposited when severed from the mass.

The conveyor is given a step-by-step motion by means of a feed ratchet 25 on a shaft 21, which is engaged by a pawl 27 on a rocket 26 that is actuated by a crank disc 28 on the shaft 2, the pin 29 of which disc is connected to the rocker 26 by a connecting rod 30 (see Fig. 2).

The shaft 2 also has a quick acting cam 31 which cooperates with a cam-engaging lever 32 pivoted at 33 and having a cam-engaging roller 34 (see Fig. 1).

A connecting rod 35 joins the lever 32 with the arm 38 on the rock shaft 37 of the cutting mechanism. The shaft 37 is mounted in bearing brackets 36 secured to the upward extension 43 of the frame. A spring 39 serves continuously to hold roller 34 against cam 31.

The shaft 37 carries two forked arms 40, in which the trunnions 42 of the cutter-carrying bar 41 are mounted. The bar 41 is apertured to slide up and down on pins 83 carried by the supports 57.

To the bar 41 is secured a set of cut-off wire carriers 81 to which the cutting wire 82 is fastened, at the place shown, in any suitable way.

The frame 1 has upper extensions 43 joined by a cross plate or bar 44 on which the upper and lower feed-roll-bearing castings 45 and 46 are mounted, and to which castings the feed-roll covers 47 are fastened. Feed-roll shafts 49 and 50 are journaled in such castings and carry feed rolls 48 (preferably corrugated, as shown). The shafts 49 and 50 are geared together, as at 51, and are driven, step-by-step, by means of a sprocket 52 on shaft 49 and the chain 53 which passes around sprocket 12 (see Fig. 2).

54 designates the hopper, the front and back walls 54$^x$ of which lie over the shafts 49 and 50 so that the inner surfaces of those walls will be spaced apart substantially not more than the distance between the axes of the shafts 49 and 50; thus the material above the rolls will be forced inwardly and downwardly only until it passes below the rolls where it is forced through the passage 67. In order to prevent the sticky mass following the rolls around, scraper bars 85 are located at each side of the passage 67 in Fig. 3, and cut off the material not pocketed within the circumference of the rolls.

Referring now particularly to Figs. 3, 4, 5 and 6, it will be seen that valve chest end-plates 55 are secured through flanges 56 to the underside of the cross bar 44.

Between these end plates 55 are mounted a valve chest front-casting 59, a valve chest back-casting 65, a plunger receiving block 62, and an outlet or die plate or block 60. The two end plates 55 are connected together at the bottom by a plate 58.

The die plate 60 has passages 61 to give the required shape to the candy extruded therefrom.

From Fig. 3 it will be seen that the die plate 60 has relatively long passages so that the material remaining therein after wire 82 has severed the expressed mass therefrom, act as temporary plugs, as it were, to prevent the material in the passages from being sucked back during the return movement of the plungers, which on the return movement, allow the mass on top of the plungers as it is being withdrawn to be fed down by the rolls 48 and occupy the spaces vacated by the plungers.

By properly proportioning the passages 61, properly timing the feed rolls, and the actions of the valve plate 77 and the plungers 68, and also due to the fact that the extruding apertures have no closing shutters at their discharge ends there will be delivered soft packed shapes from the mass of material without pressing the oil or liquids from the mass (for instance, which would tend to change the formula or the quality of the materials desired).

The plunger receiving block is bored at 64 to receive the plungers 68. A portion of the block, in line with the passage 67, and that between the front and back castings 59, 60, is cut away and dividers 63 with beveled upper edges are provided between each plunger position. The front block 59 is recessed at 66 to receive the end of the cut-off valve plate 77 which slides in and out between the rear chest block 65 and the top surface of the plunger receiving block 62. To assist the sliding valve 77 to pass through the plastic mass, its front edge is sharpened as a knife, as at 78.

Each plunger 68 has a head and neck 69 which is mounted between a cross bar 70 and two L-shaped-in-cross-section bars 71. This permits the plungers to center themselves, should one plunger hole be closer to another than the others are.

Secured to and projecting from the cross bar 70 are a plurality of studs 72 which pass through holes in a plunger-actuating cross bar 74 having trunnions 75 to rest in the forks of arms 86 secured to shaft 4.

Nuts 76 on the spindle 72 serve to limit free motion of bar 75 from the bar 70, while collars 73 on spindles 72 serve to limit the inward motion of the plungers.

The trunnions 79 on the ends of the valve bar 80 lie in the forks of arms 87.

The pins 83 on which the cutter bars ride up and down are firmly fastened in the supports 57, as before intimated, and the edge faces of the wire carriers lie flush against the front walls of the front valve chest casting 59, as shown, so as to avoid waste of material.

As shown in Fig. 13, the extruding apertures in the die block may be of any desired cross section, round 61$^a$, triangular 61$^b$, four-sided with only two sides parallel 61$^c$, hexagonal 61$^d$, or square 61$^e$, or a die block 60$^a$ with apertures of all shapes may be used if desired.

*Operation*

With the hopper or tank 54 supplied with candy in plastic form and with power applied by motor M to the first motion shaft 2, the tray conveyor 23 will be set in motion step-by-step (the length of the steps depending on the length of the candy wafer, lozenge, or stick to be produced), the feed rolls 48 will be rotated step-by-step in harmony with the movements of the conveyor 23 to feed down the required amount of plastic.

The valve plate 77 will at the proper time be forced in to cut off the feed to the plunger carrier's chamber and then the plungers will be forced inward to force the material through the die block. As soon as the desired amount has been forced through, the plungers 68 recede, the wire-cutter operates to sever the extruded portions from the remainder and after withdrawal of the valve plate 77, the material above is fed down to fill the grooves between the dividers 63 again, thus completing the cycle of operation.

Should it be found that when the valve and plungers are in their withdrawn position (Fig. 3) that the material oozes out of the die openings, i. e., the rolls 48 feed too much material, their rotation is slackened by adjustment of the pin 7 closer to the shaft 2.

The amount of material extruded will then depend solely on the stroke of the plungers. The length of the stroke outwardly is variable by adjusting nuts 76 to increase or decrease the space between the bar 74 and the sleeve 73, i. e., by increasing or decreasing the lost motion between bars 74 and 70.

From the foregoing description, taken in connection with the accompanying drawings, it is thought that the construction, operation and advantages of the invention will be clear to those skilled in the art, and I wish it understood that changes in the details of construction and arrangement of parts may be made without departing from the spirit of the invention and the scope of the appended claims.

While my machine has been primarily designed as a candy machine, it may also be used for forming shapes from other plastic materials if desired.

What I claim is:

1. In a machine of the class described, a supporting frame, a first motion shaft journaled therein, a reservoir for plastic material mounted on the frame, a die expressing mechanism beneath said reservoir, feed rolls for forcing material from said reservoir into said die expressing mechanism, means to drive said feed rolls step-by-step and to operate said die expressing mechanism from said first motion shaft in harmony with said feed rolls, and means to sever extruded shapes from the mass.

2. In a machine of the class described, a supporting frame, a first motion shaft journaled therein, a reservoir for plastic material mounted on the frame, a die expressing mechanism beneath said reservoir, feed rolls for forcing material from said reservoir into said die expressing mechanism, means to drive said feed rolls step-by-step and to operate said die expressing mechanism from said first motion shaft in harmony with said feed rolls, and means to sever extruded shapes from the mass, said reservoir having a throat of a length substantially equal to the length of the feed rolls and a width less than the distance between the axes of the adjacent feed rolls.

3. In a machine of the class described, a supporting frame, a first motion shaft journaled therein, a reservoir for plastic material mounted on the frame, a die expressing mechanism beneath said reservoir, feed rolls for forcing material from said reservoir into said die expressing mechanism, means to drive said feed rolls step-by-step and to operate said die expressing mechanism from said first motion shaft in harmony with said feed rolls, means to sever extruded shapes from the mass, and scraper bars disposed below and against the feed rolls.

4. In a machine of the class described, a supporting frame, a first motion shaft journaled therein, a reservoir for plastic material mounted on the frame, a die expressing mechanism beneath said reservoir, feed rolls for forcing material from said reservoir into said die expressing mechanism, means to drive said feed rolls and to operate said die expressing mechanism from said first motion shaft in harmony with each other, means to sever extruded shapes from the mass, said die expressing mechanism including a pair of valve chest end plates, a valve chest front casting and a valve chest back casting spaced apart to form a throat below said feed rolls, a die block below said front casting, a plunger block below said back casting and having open top channels extending across the bottom of said throat to said die block, said die block and said plunger block having aligned passages, a valve plate between said back casting and said plunger block for closing said open top channels at times, plungers operating in said plunger block and its channels when said valve plate is in position to close said throat, and means to operate said valve plate and said plungers.

5. In a machine of the class described, a supporting frame, a first motion shaft journaled therein, a vertically disposed reservoir for plastic material mounted on the frame, a horizontally disposed die expressing mechanism beneath said reservoir, feed rolls for forcing material from said reservoir into said die expressing mechanism, means to drive said feed rolls and to operate said die expressing mechanism from said first motion shaft in harmony with each other, means to sever extruded shapes from the mass, and scraper bars disposed below and against the feed rolls.

6. In a machine of the class described, a frame, a first motion shaft journaled in bearings in said frame, a material reservoir, a material feeding means, a material forming means, a material severing means, all operated from said first motion shaft, said material feeding means including a pair of feed rolls having shafts, spaced castings in which their shafts are journaled, guard plates over the outer sides of said rolls, scraper bars beneath and against the rolls, gears connecting said rolls to turn in opposite directions, and means driven from said first motion shaft for imparting a step-by-step movement to said rolls.

7. In a machine of the class described, a frame, a first motion shaft journaled in bearings in said frame, a material reservoir, a material feeding means, a material forming means, a material severing means, all operated from said first motion shaft, said material forming means including a valve chest having a throat into which the feeding means delivers the material, a die block having passages through which the material is expressed, a plunger block having channels exposed to said throat and having plunger guide holes, said holes and channels aligning with the die block passages, a cut-off valve plate for closing the throat above said channels to close the channels, plungers cooperating with said plunger guide block, and operative connections between said first motion shaft and said valve plate and said plungers.

8. In a machine of the class described, a frame, a first motion shaft journaled in bearings in said frame, a material reservoir, a material feeding means, a material forming means, a material severing means, all operated from said first motion shaft, said material forming means including a valve chest having a throat into which the feeding means delivers the material, a die block having passages through which the material is expressed, a plunger block having channels exposed to said throat and having plunger guide holes, said holes and channels aligning with the die block passages, a cut-off valve plate for closing the throat above said channels to close the channels, plungers cooperating with said plunger guide block, and operative connections between said first motion shaft and said valve plate and said plungers, the operative connections for said plungers including a bar to which said plungers are floatingly attached, a second bar, adjustable-stroke connections between said bars, and means driven from said first motion shaft to move said second bar bodily laterally back and forth parallel to itself.

9. In a machine of the class described, a frame, a first motion shaft journaled in bearings in said frame, a material reservoir, a material feeding means, a material forming means, a material severing means, all operated from said first motion shaft, said material forming means including a valve chest having a throat into which the feeding means delivers the material, a die block having passages through which the material is expressed, a plunger block having channels exposed to said throat and having plunger guide holes, said holes and channels aligning with the die block passages, a cut-off valve plate for closing the throat above said channels to close the channels, plungers cooperating with said plunger guide block, and operative connections between said first motion shaft and said valve plate and said plungers, the operative connections for said plungers including a bar to which said plungers are attached, a second bar, adjustable-stroke connections between said bars, and means driven from said first motion shaft to move said second bar bodily laterally back and forth parallel to itself.

10. In a machine of the class described, a frame, a first motion shaft journaled in bearings in said frame, a material reservoir, a material feeding means, a material forming means, a material severing means, all operated from said first motion shaft, said material forming means including a valve chest having a throat into which the feeding means delivers the material, a die block having passages through which the material is expressed, a plunger block having channels exposed to said throat and having plunger guide holes, said holes and channels aligning with the die block passages, a cut-off valve plate for closing the throat above said channels to close the channels, plungers cooperating with said plunger guide block, and operative connections between said first motion shaft and said valve plate and said plungers, the operative connections for said plungers including a bar to which said plungers are attached, a second bar, adjustable-stroke connections between said bars, and means driven from said first motion shaft to move said second bar bodily laterally back and forth parallel to itself, said adjustable-stroke connections comprising studs carried by the first bar and passing through holes in the second bar, nuts threaded on said studs adjacent their ends, and spacing sleeves on said studs between said bars.

11. In a machine of the class described, a frame, a first motion shaft journaled in bearings in said frame, a material reservoir, a material feeding means, a material forming means, a material severing means, all operated from said first motion shaft, said material forming means including a valve chest having a throat into which the feeding means delivers the material, a die block having passages through which the material is expressed, a plunger block having channels exposed to said throat and having plunger guide holes, said holes and channels aligning with the die block passages, a cut-off valve plate for closing the throat above said channels to close the channels, plungers cooperating with said plunger guide block, and operative connections between said first motion shaft and said valve plate and said plungers, the operative connections for said plungers including a bar to which said plungers are attached, a second bar, adjustable-stroke connections between said bars, and means driven from said first motion shaft to move said second bar bodily laterally back and forth parallel to itself, said material severing means comprising a wire and means to move it bodily across the outer end face of said die block to cut off the extruded shapes.

12. In a machine of the class described, a frame, a first motion shaft journaled in bearings in said frame, a material reservoir, a material feeding means, a material forming means, a material severing means, all operated from said first motion shaft, said material forming means including a valve chest having a throat into which the feeding means delivers the material, a die block having passages through which the material is expressed, a plunger block having channels exposed to said throat and having plunger guide holes, said holes and channels aligning with the die block passages, a cut-off valve plate for closing the throat above said channels to close the channels, plungers cooperating with said plunger guide block, and operative connections between said first motion shaft and said valve plate and said plungers, the operative connections for said plungers including a bar to which said plungers are attached, a second bar, adjustable-stroke connections between said bars, and means driven from said first motion shaft to move said second bar bodily laterally back and forth parallel to itself, said adjustable-stroke connections comprising studs carried by the first bar and passing through holes in the second bar, nuts threaded on said studs adjacent their ends, and spacing sleeves on said studs between said bars, said material severing means comprising a wire and means to move it bodily across the outer end face of said die block to cut off the extruded shapes.

13. In a machine of the class described, a frame, a first motion shaft journaled in bearings in said frame, a material reservoir, a material feeding means, a material forming means, a material severing means, all operated from said first motion shaft, said material forming means including a valve chest having a throat into which the feeding means delivers the material, a die block having passages through which the material is expressed, a plunger block having channels exposed to said throat and having plunger guide holes, said holes and channels aligning with the die block passages, a cut-off valve plate for closing the throat above said channels to close the channels, plungers cooperating with said plunger guide block, and operative connections between said first motion shaft and said valve plate and said plungers, said die block passages being relatively long with respect to their diameters.

14. In a machine of the class described, a frame, a first motion shaft journaled in bearings in said frame, a material reservoir, a material feeding means, a material forming means, a material severing means, all operated from said first motion shaft, said material forming means including a valve chest having a throat into which the feeding means delivers the material, a die block having passages through which the material is expressed, a plunger block having channels exposed to said throat and having plunger guide holes, said holes and channels aligning with the die block passages, a cut-off valve plate for closing the throat above said channels to close the channels, plungers cooperating with said plunger guide block, and operative connections between said first motion shaft and said valve plate and said plungers, said die block passages being of a length at least twice their cross sectional dimensions.

15. In a machine of the class described, a supporting frame, a first motion shaft journalled thereon, a reservoir for plastic material mounted on the frame, a die expressing mechanism including a plunger block, a reciprocating plunger operable in said block and an outlet die, a throat between said reservoir and said plunger block, said plunger block having an opening communicating with said throat, a cut-off valve plate for closing said opening, feed means for delivering material from said reservoir to said throat, means for operating said valve plate and said plunger and imparting step-by-step movement to said feed means in timed relation to the movements of said valve plate and said plunger.

16. In a machine of the class described, a frame, a first motion shaft journalled in bearings in said frame, a material reservoir having a bottom outlet, a material feeding means having a top inlet registering with the outlet of said reservoir and having a bottom outlet, said material feeding means including a pair of feed rolls located between the inlet and outlet of said material feeding means and rotating toward one another, said last named inlet being of a width approximately equal to the distance between the axes of said rolls and said last named outlet being of a width less than the distance between said axes, a die expressing mechanism disposed below said last named outlet and into which the material is delivered, and means for operating said rolls and said mechanism.

17. In a machine of the class described, a frame, a first motion shaft journalled in bearings in said frame, a material reservoir having a bottom outlet, a material feeding means having a top inlet registering with the outlet of said reservoir and having a bottom outlet, said material feeding means including a pair of feed rolls located between the inlet and outlet of said material feeding means and rotating toward one another, said last named inlet being of a width approximately equal to the distance between the axes of said rolls and said last named outlet being of a width less than the distance between said axes, and a die expressing mechanism disposed below said last named outlet and into which the material is delivered, said die expressing mechanism including an elongated die through which the material is forced, a plunger for forcing material through said die, the material in said die, during the return stroke of the plunger serving as a plug to prevent the material in the die from being sucked back during such return stroke.

18. In apparatus of the character described, a reservoir, a material forming and ejecting means, an intermittently actuated material feeding means disposed operatively between the reservoir and the forming and ejecting means, said material forming and ejecting means including a die having an elongated passage, through which the material is forced, and a plunger for forcing the material through the die passage, said die passage being shaped so that the material in said passage will be retained therein and serve as a plug to prevent withdrawal of the material from the die on the return or suction stroke of the plunger.

EDWARD W. BRIDGE.